(12) United States Patent
Huang et al.

(10) Patent No.: US 11,725,577 B2
(45) Date of Patent: *Aug. 15, 2023

(54) OSCILLATING ASSEMBLY, EXHAUST SYSTEM AND METHOD OF USING

(71) Applicant: TAIWAN SEMICONDUCTOR MANUFACTURING COMPANY, LTD., Hsinchu (TW)

(72) Inventors: Po-Hsuan Huang, Hsinchu (TW); Tung-Lin Yang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,212

(22) Filed: Jul. 12, 2022

(65) Prior Publication Data

US 2022/0349340 A1 Nov. 3, 2022

Related U.S. Application Data

(60) Continuation of application No. 16/934,829, filed on Jul. 21, 2020, now Pat. No. 11,401,860, which is a
(Continued)

(51) Int. Cl.
| | |
|---|---|
| *F02B 77/04* | (2006.01) |
| *F01N 3/02* | (2006.01) |
| *B08B 7/02* | (2006.01) |
| *B08B 9/027* | (2006.01) |
| *F01N 13/08* | (2010.01) |

(52) U.S. Cl.
CPC ............... *F02B 77/04* (2013.01); *B08B 7/02* (2013.01); *B08B 9/027* (2013.01); *F01N 3/02* (2013.01); *F01N 13/08* (2013.01); *F01N 2510/10* (2013.01); *Y02T 10/12* (2013.01)

(58) Field of Classification Search
CPC ... B08B 7/02; B08B 9/027; F01N 3/02; F01N 13/08; F01N 2510/10; F02B 77/04; Y02T 10/12
See application file for complete search history.

(56) References Cited

U.S. PATENT DOCUMENTS

| | | | | |
|---|---|---|---|---|
| 10,731,552 B2 * | 8/2020 | Huang | ...................... | F01N 3/02 |
| 11,401,860 B2 * | 8/2022 | Huang | ...................... | B08B 7/02 |

(Continued)

FOREIGN PATENT DOCUMENTS

| | | |
|---|---|---|
| JP | 09246672 | 9/1997 |
| JP | 2007059659 | 3/2007 |

OTHER PUBLICATIONS

Machine Translation of Abstract of JP 09246672 to Omi, Sep. 1997. (Year: 1997).

(Continued)

*Primary Examiner* — Benjamin L Osterhout
(74) *Attorney, Agent, or Firm* — Hauptman Ham, LLP

(57) ABSTRACT

An exhaust system includes an exhaust line configured to receive an exhaust mixture. The exhaust system further includes an oscillating assembly connected to the exhaust line. The exhaust system further includes a feedback path extending from an external gas source to the oscillating assembly, wherein the feedback path is separate from the exhaust line.

20 Claims, 6 Drawing Sheets

Related U.S. Application Data division of application No. 15/478,672, filed on Apr. 4, 2017, now Pat. No. 10,731,552.

(60) Provisional application No. 62/427,647, filed on Nov. 29, 2016.

(56) References Cited

U.S. PATENT DOCUMENTS

| | | |
|---|---|---|
| 2007/0221125 A1 | 9/2007 | Kaushal et al. |
| 2007/0224712 A1 | 9/2007 | Kaushal et al. |
| 2012/0138093 A1 | 6/2012 | Sappok et al. |
| 2012/0175819 A1 | 7/2012 | Miya et al. |

OTHER PUBLICATIONS

Machine Translation of Abstract of JP 2007059659 to Yokawa, Mar. 2007. (Year: 2007).

* cited by examiner

OSCILLATING ASSEMBLY, EXHAUST SYSTEM AND METHOD OF USING

PRIORITY CLAIM

The instant application is a continuation of U.S. application Ser. No. 16/934,829, filed Jul. 21, 2020, which is a divisional application of U.S. application Ser. No. 15/478,672, filed Apr. 4, 2017, now U.S. Pat. No. 10,731,552, issued Aug. 4, 2020, which is a non-provisional application claiming priority to Provisional Application No. 62/427,647, filed Nov. 29, 2016, the entire contents of which are incorporated by reference herein.

BACKGROUND

Flow disruption sites in an exhaust system impede removal of gases and particles from an upstream source of the exhaust system. Bends and connectors in exhaust lines disrupt exhaust flow by slowing the movement of exhaust gases, which reduces pumping efficiency. Particulate matter suspended or transported by the exhaust system tends to collect at flow disruption sites in the exhaust system. Buildup of particulate matter in an exhaust line reduces an area of the exhaust line available for exhaust gases and particles to flow through the exhaust system. Buildup of particulate matter reduces pumping efficiency and leads to increased maintenance to manually remove buildup and maintain uninterrupted exhaust flow within desired specifications and consequently reduces operating efficiency.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or decreased for clarity of discussion.

DESCRIPTION

Figure 1A:
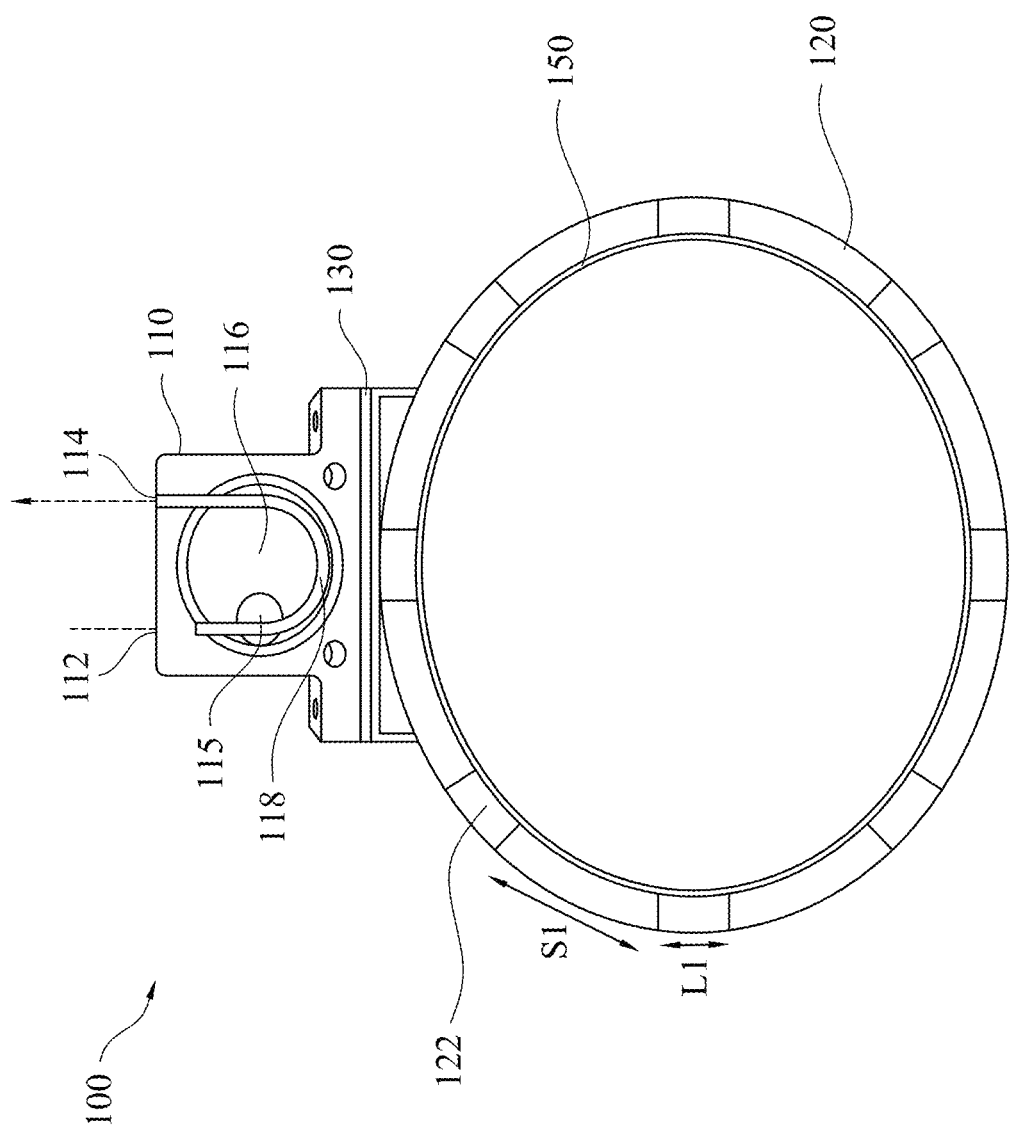
FIG. 1A is a cross-sectional view of an oscillating assembly, according to some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Many exhaust systems handle exhaust streams that include particulate matter. In some instances, particulate matter builds up within the exhaust system, particularly at flow disruption sites. A flow disruption leads to a decrease in flow velocity through the exhaust system. Flow velocity through the exhaust system changes based on changes in exhaust line diameters, changes in bends in exhaust lines, and changes at connectors between exhaust lines. Decreased flow velocity results in particles, which are suspended in the exhaust stream, contacting and adhering to interior walls of the exhaust system lines, or other particles adhered to the interior walls, with greater frequency than with nominal flows of the exhaust system. For example, at an entrance of the exhaust system, a diameter of the exhaust line tends to be larger. The larger diameter of the exhaust line reduces a flow velocity within the exhaust line in comparison with smaller diameter exhaust lines. Nominal flow velocity overcomes frictional forces that adhere particles to interior walls of exhaust lines or other particles; however, where the flow velocity is reduced, a risk of particles adhering to interior walls of the exhaust line increases. Adhering particles create a compound effect that, once begun, promotes further particle adhesion where particles have begun to collect in an exhaust line.

Over time, particle buildup in the exhaust system reduces the flow velocity for the exhaust system. Reduced flow velocity corresponds to reduced particle removal efficiency. In some instances, reduced flow velocity and reduced particle removal efficiency contribute to contamination of semiconductor wafers or other materials that are handled by manufacturing equipment. In some instances, reduced particle removal efficiency raises the frequency of preventive maintenance. Maintenance of the exhaust system to remove the adhered particles from the exhaust lines restores clogged systems to nominal functionality. However, maintenance includes removing a tool connected to the exhaust system from normal operation during performance of the maintenance procedure. Maintenance due to particulate contamination reduces availability and productivity of manufacturing equipment. In some embodiments, the interior wall of an exhaust line is a coated surface. The coating on the coated surface includes, in some embodiments, at least one of polytetrafluoroethylene (PTFE), polyurethane, polypropylene, nylon, or another coating with a coefficient of static friction that is smaller than the coefficient of static friction of stainless steel.

Agitating particles adhered to the interior wall of an exhaust line helps the flow within the exhaust line to remove particles from the interior wall, thereby reducing particle buildup within the exhaust line. The particles within the exhaust line are agitated by inducing vibrations of the exhaust line. The movement of the exhaust line is transferred to the particles and pushes the particles back toward a center of the exhaust line where a flow velocity is highest. By agitating particles within the exhaust line, particle buildup within the exhaust line is slowed. As a result, preventive maintenance schedules are extended and manufacturing tools attached to the exhaust line remain in operation for a greater period of time and overall production capacity is increased.

FIG. 1A is a cross-sectional view of an oscillating assembly 100 in accordance with some embodiments. Oscillating assembly 100 includes an oscillating element 110 connected to a securing device 120 with a gasket 130 between the oscillating element 110 and the securing device 120. Securing device 120 is configured to attach oscillating assembly 100 to an exhaust line 150 of an exhaust system. One of ordinary skill in the art would recognize that exhaust line 150 is labeled in FIG. 1A for clarity and is not part of oscillating assembly 100. Oscillating element 110 is configured to create an oscillating movement which is transferred to exhaust line 150 through securing device 120.

Oscillating element 110 includes an inlet 112 configured to receive a flow of gas and an outlet 114 configured to output the gas. Inlet 112 and outlet 114 are both connected to a chamber 116. A moveable element 115 is located within chamber 116. A gas passing from inlet 112 to outlet 114 through chamber 116 creates a flow path 118. The movement of the gas along flow path 118 causes moveable element 115 to move within chamber 116. By controlling a flow rate and/or a pressure of gas, the movement of moveable element 115 creates an oscillating motion by oscillating element 110.

In some embodiments, oscillating element 110 has a different configuration. For example, in some embodiments, oscillating element includes a motor configured to rotate an element having an unbalanced weight. The rotation of the unbalanced weight results in an oscillating motion of oscillating element 110. In some embodiments, moveable element 115 is omitted and a velocity of the gas through chamber 116 is controlled to create an oscillating motion.

Oscillating element 110 includes a strong and resilient material which has a sufficient mechanical strength to resist damage by movement of moveable element 115. As a weight of oscillating element 110 increases an amount of kinetic energy generated by the oscillating motion increases; however, the velocity of the gas through chamber 116 is increased in order to create the oscillating motion. In some embodiments, oscillating element 110 includes stainless steel, iron, aluminum or another suitable material.

Inlet 112 is configured to receive the flow of gas. In some embodiments, inlet 112 includes a threaded opening to receive a conduit for conducting the flow of gas. In some embodiments, inlet 112 includes a check valve to prevent a flow of gas in a direction out of chamber 116 by way of inlet 112. In some embodiments, inlet 112 includes a controllable valve configured to selectively permit the flow of gas to enter chamber 116. As a diameter D1 of inlet 112 increases, a velocity of gas along flow path 118 decreases. A higher velocity of gas along flow path 118 increases a speed of moveable element 115 and increases a frequency of the oscillating motion. In some embodiments, diameter D1 of inlet 112 ranges from about 1 centimeter (cm) to about 5 cm.

Outlet 114 is configured to output the flow of gas. In some embodiments, outlet 114 includes a threaded opening to receive a conduit for conducting the flow of gas. In some embodiments, outlet 114 includes a check valve to prevent a flow of gas in a direction into chamber 116 by way of outlet 114. In some embodiments, outlet 114 includes a controllable valve configured to selectively permit the flow of gas to exit chamber 116. As a diameter D2 of outlet 114 increases, a velocity of gas along flow path 118 decreases. In some embodiments, diameter D2 of outlet 114 ranges from about 1 cm to about 5 cm. In some embodiments, outlet 114 has a same diameter as inlet 112. In some embodiments, outlet 114 has a different diameter from inlet 112. In some embodiments, inlet 112 has a larger diameter than outlet 114. In some embodiments, inlet 112 has a smaller diameter than outlet 114.

Moveable element 115 includes a ball bearing. A material of moveable element 115 is sufficiently strong and resilient to resist damage during movement within chamber 116. As a weight of moveable element 115 increases an amount of kinetic energy generated by movement of moveable element 115 within chamber 116 increases; however, the velocity of the gas through chamber 116 is increased in order to move moveable element 115. In some embodiments, a weight of moveable element 115 ranges from about 0.005 kilograms (kg) to about 0.5 kg. In some embodiments, moveable element 115 includes stainless steel, iron, aluminum or another suitable material. In some embodiments, a material of oscillating element 110 and moveable element 115 is a same material. In some embodiments, a material of oscillating element 110 is different from a material of moveable element 115. In some embodiments, oscillating element 110 includes aluminum and moveable element 115 includes stainless steel.

Moveable element 115 has a spherical shape. The spherical shape helps to permit moveable element 115 to move within chamber 116 with minimal damage to interior walls of chamber 116. The spherical shape of moveable element 115 also helps to facilitate a more uniform oscillating motion. In some embodiments, moveable element 115 has a diameter ranging from about 0.5 cm to about 1 cm. A greater diameter requires a bigger oscillating element 110, thereby increasing a manufacturing cost without a significant improvement in functionality, in some instances. A smaller diameter provides insufficient vibration to agitate particles within the exhaust line, in some instances. In some embodiments, moveable element 115 has a different shape in order to create a more turbulent oscillating motion. A turbulent oscillating motion will help increase agitation of particles within exhaust line 150, in some instances. In some embodiments, moveable element 115 is polygonal prism, egg-shaped, freeform-shaped or another suitable shape.

Chamber 116 is an opening within oscillating element 110 to permit moveable element 115 to move and create the oscillating motion. Chamber 116 is circular. The circular shape of chamber 116 helps to provide a smooth flow path 118 in order to create a more uniform oscillating motion. In some embodiments, chamber 116 has a different shape in order to create a more turbulent oscillating motion. In some embodiments, chamber 116 is polygonal, oval or freeform-shaped. In some embodiments which omit moveable element 115, chamber 116 is shaped to create the oscillating motion based solely on the gas travelling along flow path 118. Chamber 116 is centered in oscillating element 110. In some embodiments, chamber 116 is offset from a center of oscillating element 110 in order to increase an amplitude of the oscillating motion.

Flow path 118 determines a direction that moveable element 115 travels within chamber 116. Flow path 118 is determined based on a location of inlet 112 and outlet 114 as well as a shape of chamber 116.

Securing device 120 attaches oscillating element 110 to exhaust line 150. Securing device 120 is a collar. In some embodiments, securing device 120 includes a magnet, a clamp, screws, rivets, springs, welding, adhesive or another suitable attachment mechanism. Securing device 120 extends around an entire circumference of exhaust line 150. In some embodiments, securing device 120 extends around only a portion of the circumference of exhaust line 150. Securing device 120 includes a plurality of contact points 122 which directly contact exhaust line 150. Contact points 122 transfer the oscillating motion from oscillating element 110 to exhaust line 150. In some embodiments, securing device 120 includes aluminum, iron, steel or another suitable material.

Contact points 122 help to pass vibration generated from oscillating element 110. In some embodiments, contact points 122 help to reduce wear on exhaust line 150 during operation of oscillating assembly 100. Instead of the entirety of securing device 120 directly contacting exhaust line 150, a reduced area of exhaust line 150 is contacted by contact points 122. This arrangement helps to reduce wear because during operation securing device 120 will move slightly with respect to exhaust line 150 causing the two structures to rub against one another. By using contact points 122, securing device 120 is able to be repositioned around exhaust line 150 in order to change a location of the wearing on exhaust line 150. Contact points 122 include a softer material than exhaust line 150 in order to reduce wear on exhaust line 150 during operation of oscillating assembly 100. In some embodiments, contact points 122 include aluminum, iron, steel or another suitable material. In some embodiments, contact points 122 have a same material as the rest of securing device 120. In some embodiments, contact points 122 have a different material from the rest of securing device 120. In some embodiments, a useful life of oscillating assembly 100 is at least 1.5 years. A longer useful life means that manufacturing costs are reduced.

In some embodiments, contact points 122 are integral with a rest of securing device 120. In some embodiments, contact points 122 are removable from the rest of securing device 120 in order to facilitate replacement of contact points 122. In some embodiments, removable contact points 122 are attached to the rest of securing device 120 by screws, detents, adhesive or other suitable components.

Contact points 122 are evenly distributed around exhaust line 150. In some embodiments, a length of contract points 122 ranges from about 0.5 cm to about 1 cm. In some embodiments, a spacing between adjacent contract points 122 ranges from about 0.5 cm to about 1 cm. In some embodiments, a spacing between two adjacent contact points 122 is different from a spacing between two other adjacent contact points 122.

Gasket 130 helps to reduce wear on oscillating element 110 and securing device 120 during operation of oscillating assembly 100. Gasket 130 includes a softer material than oscillating element 110 and securing device 120. In some embodiments, gasket 130 is connected to oscillating element 110 by screws extending through gasket 130 and connecting the securing device 120. In some embodiments, gasket 130 is attached to securing device 120 or oscillating element 110 by an adhesive.

Figure 1B:
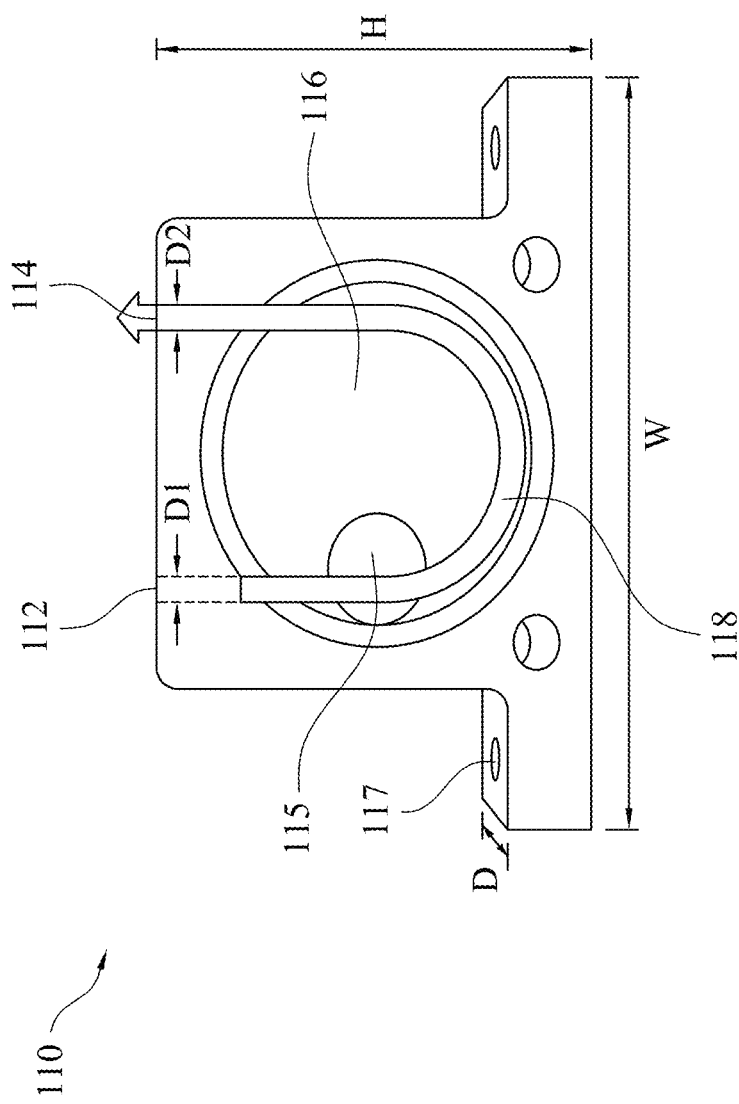
FIG. 1B is a cross-sectional view of an oscillating element, according to some embodiments.

FIG. 1B is a cross-sectional view of oscillating element 110 in accordance with some embodiments. FIG. 1B is a larger view of oscillating element in comparison with that provided in FIG. 1A. An attachment opening 117 is more visible in FIG. 1B than FIG. 1A. Attachment opening 117 permits attaching elements, such as a screw, to extend through oscillating element 110 through gasket 130 (FIG. 1A) and into securing device 120.

Oscillating element 110 has a width W ranging from about 7 cm to about 16 cm. A height H of oscillating element 110 ranges from about 4 cm to about 10 cm. A depth D of oscillating element 110 ranges from about 1.5 cm to about 5.5 cm. As the dimensions of oscillating element 110 increase, a mass of oscillating element also increases. The mass of oscillating element 110 impacts an amount of kinematic energy created by the oscillating motion.

Figure 2B:
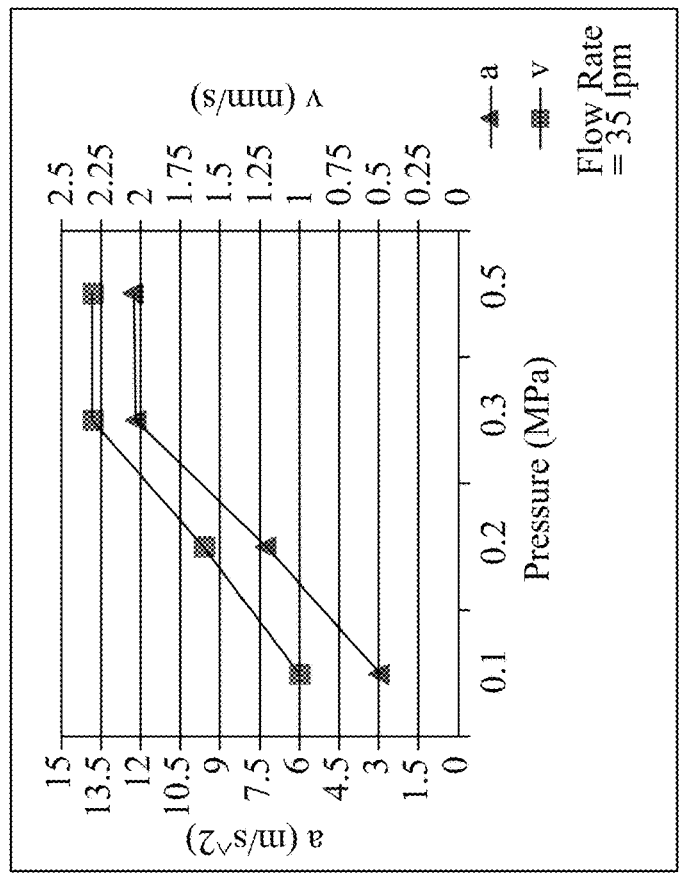
FIG. 2B is a graph of a relationship between a pressure of gas and acceleration/velocity of an oscillating assembly, according to some embodiments.
Figure 2A:
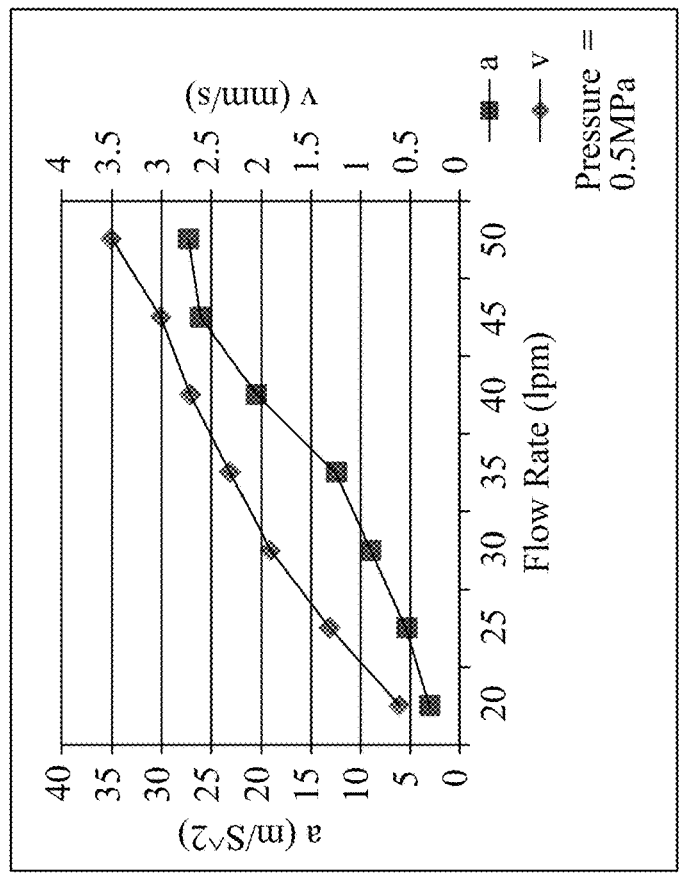
FIG. 2A is a graph of a relationship between a flow rate of gas and acceleration/velocity of an oscillating assembly, according to some embodiments.

FIG. 2A is a graph of a relationship between a flow rate of gas and acceleration/velocity of an oscillating assembly. In some embodiments where an applied pressure is controlled around 0.5 MPa, both acceleration and velocity of oscillating assembly 100 are proportional to a flow rate of the gas. In some embodiments, inlet 112 of oscillating element 110 is configured to receive the gas at a flow rate ranging from about 30 liters per minute (lpm) to about 50 lpm, and the acceleration ranges from about 20 millimeters per second squared ($mm/s^2$) to about 35 $mm/s^2$. A greater flow increases a risk of wear of moveable element 115, in some instances. A smaller flow rate provides insufficient vibration to agitate particles within the exhaust line, in some instances. The flow rate of the gas determines the velocity of moveable element 115 within chamber 116. Based on the mass of moveable element 115, a force exerted by movement of moveable element 115 ranges from about $1 \times 10^{-3}$ Newtons (N) to about $1.75 \times 10^{-3}$ N.

FIG. 2B is a graph of a relationship between a pressure of gas and acceleration/velocity of an oscillating assembly. In some embodiments where a flow rate is controlled around 35 lpm, both acceleration and velocity of oscillating assembly 100 are proportional to a pressure of the gas in a range from 0.1 MPa to 0.3 MPa. When the pressure is greater than 0.3 MPa, both acceleration and velocity are saturated due to a limitation of the fixed flow rate.

Figure 3:
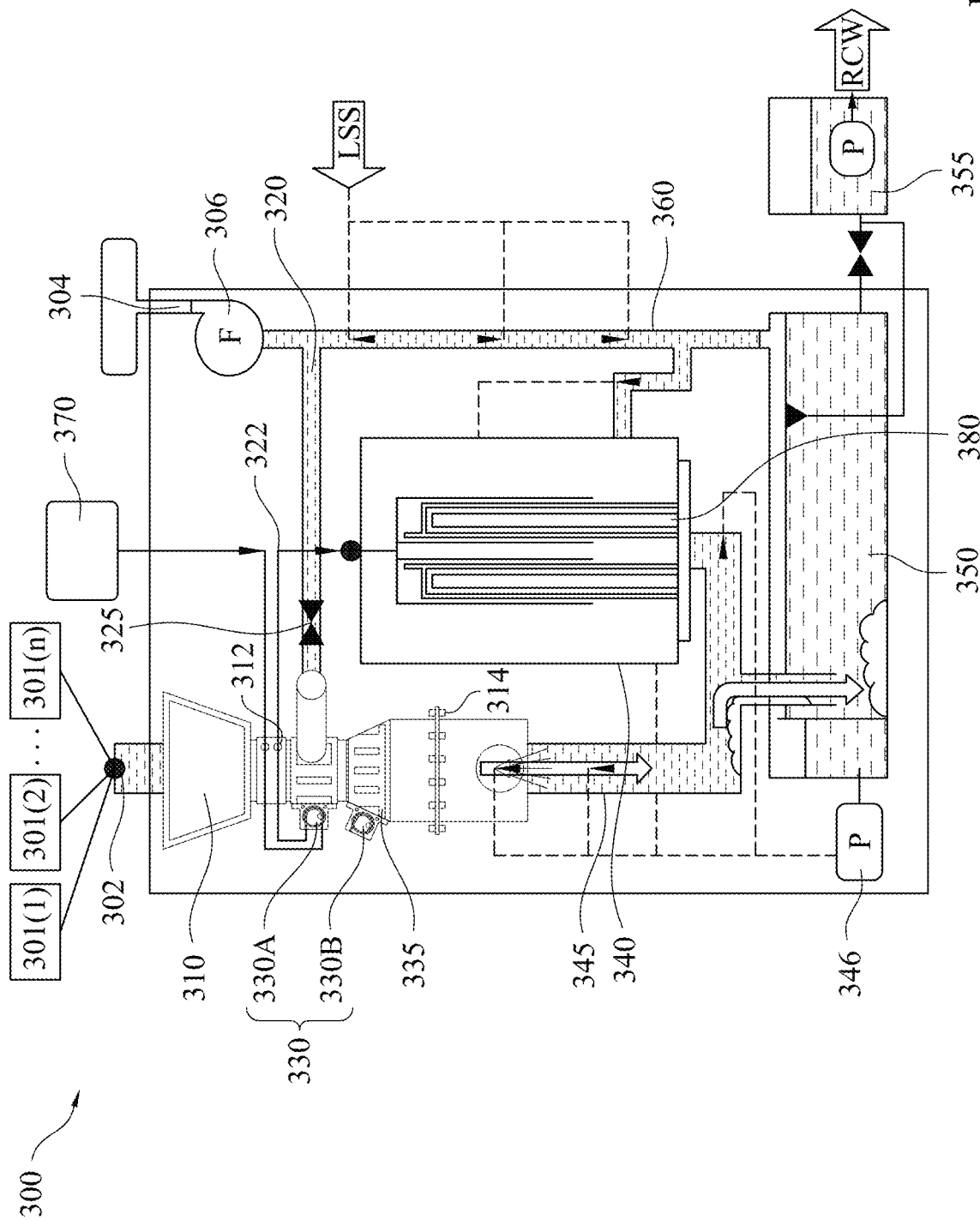
FIG. 3 is a schematic view of an exhaust system, according to some embodiments.

FIG. 3 is a schematic view of an exhaust system 300 in accordance with some embodiments. Exhaust system 300 includes a mixing box 310 connected to an inlet 302. In some embodiments, exhaust system 300 is also referred to as a local scrubber. A circulation device 306 is configured to provide a pressure differential to move particles and fluids through exhaust system 300. In at least one embodiment, circulation device 306 is a turbine. A gas outlet 304 is connected to an outlet of circulation device 306. A by-pass line 320 is connected downstream of mixing box 310. A controllable valve 325 is connected to by-pass line 320 to control the flow of gas through by-pass line 320. A feedback path 322 connects an external gas source 370 to an oscillating assembly 330. Gas from external gas source 370 is supplied to an oscillating element, e.g., oscillating element 110 (FIG. 1A) of oscillating assembly 330 along feedback path 322. Oscillating assembly 330 is connected to an exhaust line downstream of by-pass line 320. In some embodiments, oscillating assembly 330 is connected to an exhaust line upstream of by-pass line 320. In some embodiments, more than one oscillating assembly 330 is connected to the exhaust line. For example, in at least one embodiment, a first oscillating assembly 330A is positioned around a first coupling element 312 under mixing box 310, and a second oscillating assembly 330B is positioned around a second coupling element 314 above a washing section. In some embodiments, exhaust system 300 includes a vibration sensor 335. Vibration sensor 335 is configured to detect a vibration of oscillating assembly 330. In some embodiments, vibration sensor 335 is always attached to oscillating assembly 330 to monitor oscillating assembly 330 in real-time. In some embodiments, vibration sensor 335 is activated only when exhaust system 300 is operating. In some embodiments, vibration sensor 335 is attached to oscillating assembly 330 at a predetermined time interval, for example, every twelve hours. In some embodiments, vibration sensor 335 includes a laser guided sensor, an infrared sensor, a microwave motion sensor, an ultrasonic motion sensor or another suitable sensor. In some embodiments, more than one vibration sensor 335 is used to detect multiple oscillating assemblies.

An optional reactor 340 is configured to pyrolysize exhaust and/or particulate matters. A first tank 350 is configured to provide a washing fluid to the exhaust line at washing fluid inlets 345, as indicated by broken lines intersecting with the exhaust line. The washing fluid is used to flush exhaust and/or particles downward. First drain tank 350 is configured to receive particles and fluids from the exhaust line. A second drain tank 355 is selectively connected to first drain tank 350 by a valve in order to remove fluids from exhaust system 300. In some embodiments, second tank 355 is configured to recycle purified washing fluids back into exhaust system 300 by a return pipe 360. External gas source 370 is configured to supply gas to feedback path 322 and reactor 340. In some embodiments, gases to feedback path 322 and reactor 340 are separately supplied by external gas source 370 and a backup external gas source (not shown).

Exhaust system 300 is configured to remove exhaust and/or particles from a manufacturing tool. In some embodiments, the manufacturing tool includes a furnace, a lithography tool, a deposition chamber, a planarization tool, an etching tool or another suitable manufacturing tool. By removing particles from the manufacturing tool, exhaust system 300 helps to prevent contamination of a device being manufactured, e.g., a semiconductor wafer, by the particles. Inlet 302 is configured to receive an exhaust mixture from one or more manufacturing tools 301(1)-301(n). For example, in some embodiments, inlet 302 is configured to receive an exhaust mixture from a furnace and another exhaust mixture from a photolithography apparatus. The exhaust mixture includes gas(es) and particles. While only one inlet 302 is included in FIG. 3, one of ordinary skill in the art would understand that multiple inlets are included in some embodiments. The inlets are combined in mixing box 310.

Circulation device 306 is connected near gas outlet 304 of exhaust system 300 in order to provide a pressure differential through exhaust system 300 in order to move exhaust through exhaust system 300. In some embodiments, gas outlet 304 is connected to a general exhaust system (GEX), an acid exhaust system (SEX) or an ammonia exhaust system (AEX). In some embodiments, circulation device 306 includes a pump. In some embodiments, circulation device 306 includes a fan. In some embodiments, the pressure differential created by circulation device 306 is controllable to adjust a velocity of particles and fluid through exhaust system 300.

Mixing box 310 is configured to receive the particles and fluid from inlet 302, or from multiple inlets. In some embodiments, mixing box 310 connects to a heating unit configured to keep fluids in a gaseous state or a plasma-assisted unit configured to chemically break down the exhaust gas. For example, in at least one embodiment where the exhaust includes ammonium chloride, a temperature of mixing box 310 is in a range from about 100 degrees Celsius to about 130 degrees Celsius to avoid the generation of solid-state ammonium chloride. A higher temperature increases a manufacturing cost without a significant improvement in functionality, in some instances. A lower temperature increases a risk of generating more particles, in some instances. In some embodiments, mixing box 310 is integral with the heating unit or the plasma-assisted unit. Mixing box 310 helps to separate inlet 302 from the pressure differential created by circulation device 306, which could negatively impact a manufacturing tool upstream along inlet 302. Mixing box 310 contains particles as well as fluids, such as gases, received from inlet 302.

In some embodiments where the exhaust is free of particles, by-pass line 320 is configured to remove gases from the exhaust material output from mixing box 310. Controllable valve 325 is configured to selectively permit gases to flow into by-pass line 320. In some embodiments, controllable valve 325 is controlled to regulate a pressure of gases in by-pass line 320. By controlling the pressure of gases in by-pass line 320, a pressure of gases in feedback path 322 is also controlled, which helps to regulate an amount of gas(es) directly from mixing box 310.

Oscillating assembly 330 is configured to vibrate the exhaust line exiting from mixing box 310 in order to agitate particles within the exhaust line in order to reduce the risk of particle build up in the exhaust line. In some embodiments, oscillating assembly 330 is the same as oscillating assembly 100 (FIG. 1A). Oscillating assembly 330 is configured to receive gas from by-pass line 320 through feedback path 322. By using gas from feedback path 322 in order to generate the vibrations for agitating particles within the exhaust line, exhaust system 300 is able to operate more efficiently and reduce costs in comparison with other systems which rely solely on external gas supplies.

Oscillating assembly 330 is also capable of receiving gas from the backup external gas source. In some embodiments, the oscillating element of oscillating assembly 330 includes multiple inlets, e.g., one inlet connected to external gas source 370 and another inlet connected to the backup gas source.

Reactor 340 is configured to chemically break down particles and fluids which are not flushed into first drain tank 350. In some embodiments, reactor 340 includes multiple heating elements 380 configured to rise an internal temperature in a range from about 750 degrees Celsius to about 1000 degrees Celsius. In at least one instance, in order to uniformly increase the internal temperature, from about 4 to about 8 heating tubes are circularly arranged in reactor 340. In some embodiments, reactor includes a plasma-assisted element to pyrolysize particles and fluids. External gas source 370 is connected to reactor 340 to scrap particles adhered to interior walls of heating element 380, plasma-assisted element and reactor 340.

First drain tank 350 is configured to receive an output of the exhaust line including particles and washing fluid. Washing fluid from washing fluid inlets 345 is recycled to first drain tank 350 through one or more pipes. In some embodiments, first drain tank 350 includes a heat exchanger for cooling the washing fluid to promote precipitation of dissolved particles from the washing fluid. First drain tank 350 is configured to provide a washing fluid to different portions of exhaust system 300 in order to help move particles through exhaust system 300. In some embodiments, the washing fluid is water. In some embodiments, the washing fluid is a solvent configured to at least partially dissolve the particles in exhaust system 300. In some embodiments, a pressure within first drain tank 350 is controlled by controlling a pump 346. In some embodiments, the pressure within washing fluid supply is controlled by controlling external gas source 370. A higher pressure in first drain tank 350 causes the washing fluid to exit from washing fluid inlets 345 at a higher velocity and increases a flow rate of particles within exhaust system 300. However, using higher pressure also puts more stress on components of exhaust system 300 and increases costs of operating exhaust system 300.

In some embodiments, first drain tank 350 includes a heating element in order to increase a temperature of the washing fluid prior to delivery of the cleaning fluid to washing fluid inlets 345. Increasing the temperature of the washing fluid helps to dissolve more particles within the exhaust line and reduce the risk of particle build up.

Washing fluid inlets 345 are located at various points along the exhaust line. Using multiple washing fluid inlets 345 helps exhaust system 300 to help boost the flow rate of particles through exhaust system 300 and reduce the risk of particle build up. In some embodiments, each fluid inlet 345 includes a nozzle. Pump 346 helps to return washing fluid to fluid inlets 345 after the washing fluid exits the exhaust line. Recycling the washing fluid helps to reduce the cost of operating exhaust system 300. In some embodiments, an external washing fluid supply is used to provide washing fluid to fluid inlets 345.

Second drain tank 355 is connected to first drain tank 350 by a valve. The valve is configured to open to permit washing fluid to flow from first drain tank 350 to second drain tank 355 in order to transfer the washing fluid to a reclamation process in order to help remove dissolved particles in the washing fluid. For example, after repeated recycling the washing fluid may become saturated with particles and exhibit a reduced ability to assist in particle movement in the exhaust line. At this point, the washing fluid is transferred to a washing fluid reclamation process where dissolved particles are removed from the washing fluid in order to help restore the ability of the washing fluid to assist with moving particles in exhaust system 300. In some embodiments, washing fluid is purified in second drain tank 355 before recycling back to exhaust system 300.

Return pipe 360 connects first drain tank 350 to washing exhaust system 300 in order to facilitate recycling of washing fluid. Return pipe 360 is also connected to circulation device 306. Circulation device 306 helps to create sufficient pressure differential in return pipe 360 to move washing fluid from exhaust system 300 to first drain tank 350. Return pipe 360 also helps to remove any gases remaining in the exhaust line downstream of by-pass line 320 by removing the gases from first drain tank 350. Return pipe 360 is also configured to receive an external supply of washing fluid. For example, when some of the washing fluid is removed to undergo a reclamation process the external supply of washing fluid provides additional washing fluid to return pipe 360 to help maintain a sufficient amount of washing fluid in exhaust system 300 to move particles through the exhaust line.

External gas source 370 is configured to supply gas to reactor 340. External gas source 370 is further configured to supply additional gas to oscillating assembly 330 and/or washing fluid supply 340. In some embodiments, valves are used to control supply of the external gas to oscillating assembly 330 and reactor 340. External gas source 370 is configured to supply an inert gas that does not react with either the material of oscillating assembly 330 or reactor 340. In some embodiments, the inert gas includes nitrogen, argon or another suitable inert gas. Feedback path 322 is connected to oscillating assembly 330 in order to provide gas to an oscillating element of oscillating assembly 330.

A pressure of gases in feedback path 322 is controlled to help regulate an amount of oscillation motion by oscillating assembly 330 to agitate particles in the exhaust line of exhaust system 300. In some embodiments, a controllable valve is controlled based on a flow rate in the exhaust line connected to oscillating assembly 330. For example, if the flow rate in the exhaust line is below a predetermined threshold, then the controllable valve is opened to increase the pressure in feedback path 322 in order to create more vibration and greater agitation of particles in the exhaust line.

During operation of exhaust system 300, meters placed at various locations throughout exhaust system 300 monitor a flow along the exhaust line (particles or mixture of particles and washing fluid); pressure in by-pass line 320; pressure in return pipe 360 and other relevant locations. Based on the information returned from these meters, valves, such as controllable valve 325, are opened or closed in order to efficiently remove particles from exhaust system 300. For example, if the flow rate detected in the exhaust line is below a predetermined threshold, a controller opens controllable valve 325 in order to increase the pressure in by-pass line 320 and feedback path 322. As a result, an amount of vibration from oscillating assembly 330 is increased and particles in the exhaust line are more agitated. In another example, if the pressure in by-pass line 320 is below a predetermined threshold and controllable valve 325 is fully open, the controller increases a flow of gas from external gas source 370 to oscillating assembly 330.

In some embodiments, a controller connectable to exhaust system 300 is configured to use the measured flow rates and pressure to alert an operator to a need for maintenance of exhaust system 300. In some embodiments, the controller is able to alert the operator that exhaust system 300 should undergo maintenance within a predetermined time frame. In some embodiments, the controller is able to alert the operator that exhaust system 300 should undergo immediate maintenance. The differences in the alerts and the time frame for maintenance is based on the measured flow rates and pressures.

Exhaust system 300, which includes oscillating assembly 330, helps to reduce the cost of a manufacturing process. In comparison with other exhaust systems, exhaust system 300 has a preventive maintenance cycle about 4 times longer. For example, preventive maintenance is performed on an exhaust system which does not include oscillating assembly 330 on a monthly basis. However, preventive maintenance is only performed on exhaust system 300 every four months, in some instances. The increased time between preventive maintenance cycles is the result of the agitation of particles within the exhaust line which reduces the amount of particle build up. The reduced amount of preventive maintenance means that not only is exhaust system 300 in operation for more time; but also manufacturing tools connected to exhaust system 300 remain in operation. As a number of manufacturing tools connected to exhaust system 300 increases, the increase in productivity also increases.

A non-limiting example is used to highlight the impact of oscillating assembly 330. An oscillating assembly was attached to an exhaust system similar to exhaust system 300. The oscillating assembly was attached at a location below the by-pass line, similar to the location indicated in FIG. 3. In some embodiments, a flow rate of 35 lpm of nitrogen gas was supplied to an oscillating element of the oscillating assembly. The force generated by the flow of nitrogen gas was $1.3\times10^{-4}$ kilogram-force (kgf). An amount of vibration, measured as a moving velocity in mm/s, was measured at various locations of the exhaust system. Accordingly, a bearable shear force was around $3.55\times10^{-8}$ thousands of pounds per square inch (ksi). The locations are labeled 1-6 in FIG. 3. Location 1 is at a mixing box; location 2 is at an exhaust line downstream of the mixing box; location 3 is at the exhaust line downstream of location 2; location 4 is at the by-pass line; location 5 is at the exhaust line adjacent to the oscillating assembly; and location 6 is at the exhaust line downstream of location 5. The results of the test are provided in Table 1.

TABLE 1

| Location | 1 | 2 | 3 | 4 | 5 | 6 |
| --- | --- | --- | --- | --- | --- | --- |
| Oscillating assembly off | 0.4 | 0.3 | 0.3 | 0.4 | 0.4 | 0.4 |
| Oscillating assembly on | 0.4 | 0.5 | 0.5 | 0.4 | 1.1 | 0.5 |

Table 1 indicates that a vibration of the exhaust line increased nearly 300% when the oscillating element of the oscillating assembly is activated. This increased vibration in turn agitates particles within the exhaust line and reduces the risk of particle build up in the exhaust line.

Exhaust system 300 includes a single oscillating assembly 330. In some embodiments, exhaust system 300 includes multiple oscillating assemblies 330 at various locations along the exhaust line. In some instances, an oscillating assembly is added to exhaust system 300 in response to empirical evidence that shows locations of likely particle build up. In some embodiments, all oscillating assemblies in exhaust system 300 are controlled as a unit. In some embodiments, at least one oscillating assembly in exhaust system 300 is controlled independently from at least another oscillating assembly in exhaust system 300.

Figure 4:
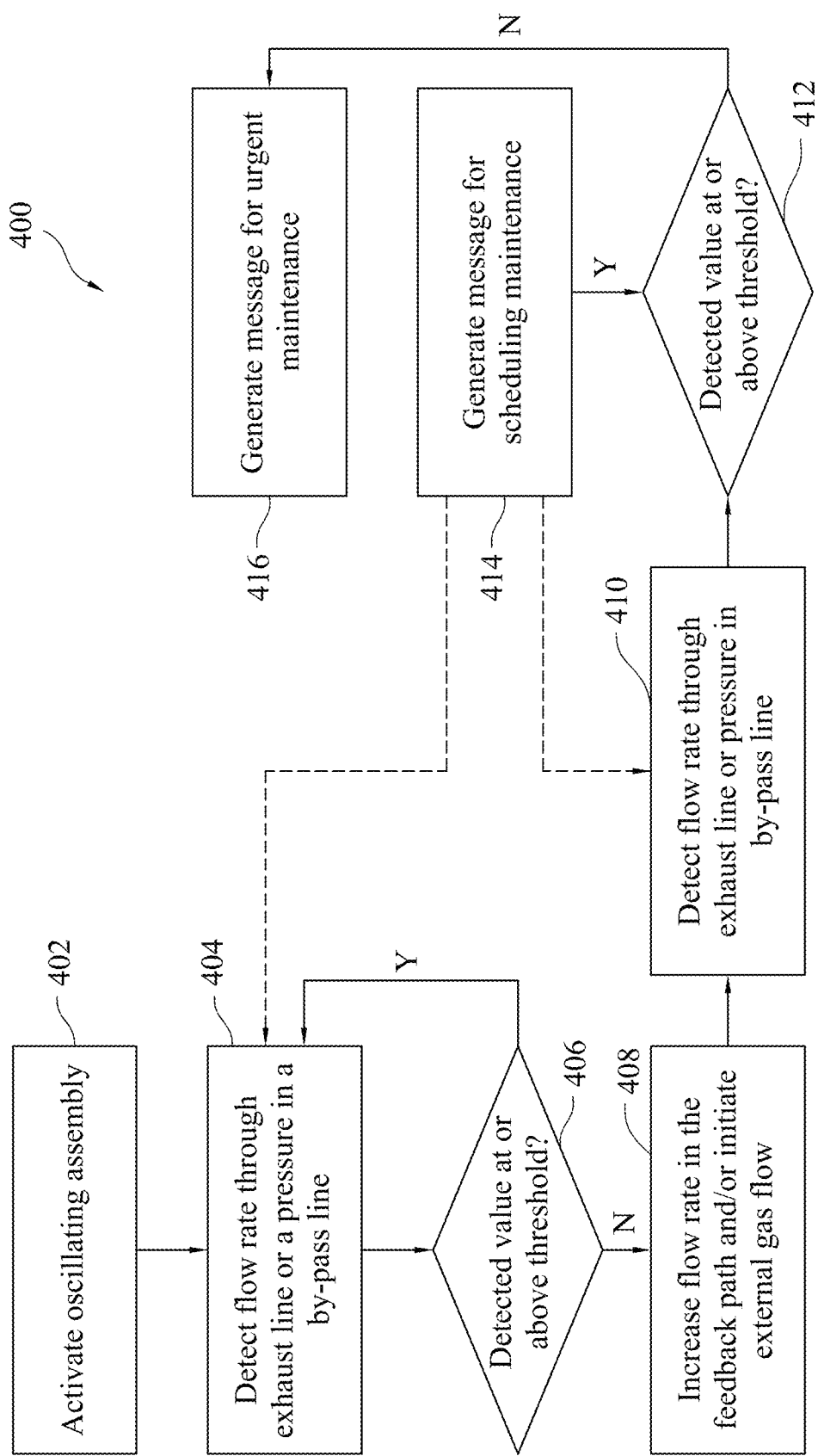
FIG. 4 is a flowchart of a method of operating an exhaust system, according to some embodiments.

FIG. 4 is a flow chart of a method 400 of operating an exhaust system in accordance with some embodiments. In operation 402, an oscillating assembly, e.g., oscillating assembly 100 or oscillating assembly 330, is activated. In some embodiments, the oscillating assembly is activated by supplying gas from a by-pass line to an oscillating element of the oscillating assembly. In some embodiments, the oscillating assembly is activated by supplying gas from an external gas source to the oscillating assembly.

In operation 404, a flow rate through an exhaust line and/or a pressure in a by-pass line, e.g., by-pass line 320, is detected. In some embodiments, both the flow rate in the exhaust line and the pressure in the by-pass line are detected. In some embodiments, only one of the flow rate in the exhaust line or the pressure in the by-pass line is detected. In some embodiments, the flow rate through the exhaust line is detected at multiple positions along the exhaust line. In some embodiments, a lowest flow rate from the multiple detected flow rates is used for the comparison in operation 406. In some embodiments, an average of the detected flow rates is used for the comparison in operation 406.

In operation 406, the detected value is compared with a predetermined threshold value. If the detected value is at or above the predetermined threshold value, then the exhaust system is considered to be working properly and no adjustment is made. As indicated by the 'Y' arrow from operation 406, the detecting and comparing are repeated so long as no value below the predetermined threshold is detected. In some embodiments, the cycle is repeated continuously. In some embodiments, the cycle is repeated periodically. If the detected value is below the predetermined threshold value, then method 400 continues to operation 408; as indicated by the 'N' arrow from operation 406.

In operation 408, a flow rate in the feedback path is increased or a flow from an external gas source, e.g., external gas source 370, is initiated. In some embodiments, each time the flow rate is increased about 10% or 5 lpm. In some embodiments, the pressure in the feedback path is increased by opening a controllable valve to increase an amount of gas in the feedback path. The gas in the feedback path is fed to the oscillating element of the oscillating assembly. Increasing the pressure in the feedback path will increase the amount of oscillating movement by the oscillating assembly. In some embodiments, the external gas flow is initiated by opening a valve to permit gas from the external gas source to be fed into the oscillating element of the oscillating assembly.

In some embodiments, the pressure in the feedback path is increased until the controllable valve is fully open before the external gas flow is initiated. In some embodiments, the pressure in the feedback path is increased simultaneously with initiation of the external gas flow.

In operation 410, the flow rate through the exhaust line and/or the pressure in the feedback path is detected. In some embodiments, both the flow rate in the exhaust line and the pressure in the feedback path are detected. In some embodiments, only one of the flow rate in the exhaust line or the pressure in the feedback path is detected. In some embodiments, the flow rate through the exhaust line is detected at multiple positions along the exhaust line. In some embodiments, a lowest flow rate from the multiple detected flow rates is used for the comparison in operation 412. In some embodiments, an average of the detected flow rates is used for the comparison in operation 412.

In operation 412, the detected value is compared with the predetermined threshold value. The predetermined threshold value is the same for operation 406 and operation 412. The predetermined threshold value is a value sufficient to permit the exhaust system to effective remove particles from a manufacturing tool to allow the manufacturing tool to operate as designed. If the detected value is at or above the predetermined threshold value, then the exhaust system is considered to be working in an acceptable range and immediate maintenance is unnecessary. As indicated by the 'Y' arrow from operation 412, method 400 proceeds to operation 414. If the detected value is below the predetermined threshold value, immediate maintenance is recommended to prevent reduced manufacturing yield. As indicated by the 'N' arrow from operation 412, method 400 continues to operation 414. In some embodiments, operation 412 is delayed for a certain period of time in order to permit the effect of operation 408 to register in the detected values of operation 410.

In operation 414, a message is generated for scheduling maintenance for the exhaust system. The message is transferred to an operator of the exhaust system. In some embodiments, the message provides a recommended time frame for performing the maintenance. In some embodiments, the message includes both a visual and auditory component. In some embodiments, following operation 414 method 400 returns to operation 404. In some embodiments, following operation 414 method 400 returns to operation 410. In some embodiments, operation 410 limits a time frame between subsequent messages generated for scheduling maintenance. For example, in some embodiments, the message for scheduling maintenance is generated at most once per week.

In operation 416, a message is generated for urgent maintenance for the exhaust system. The message is transferred to an operator of the exhaust system. In some embodiments, the message includes both a visual and auditory component.

In some embodiments, following operation 416 the exhaust system is shut down to prevent damage to the manufacturing tool. In some embodiments, the shutdown is delayed for a certain period of time following operation 416. In some embodiments, a time for shut down is included as part of the message.

Figure 5:
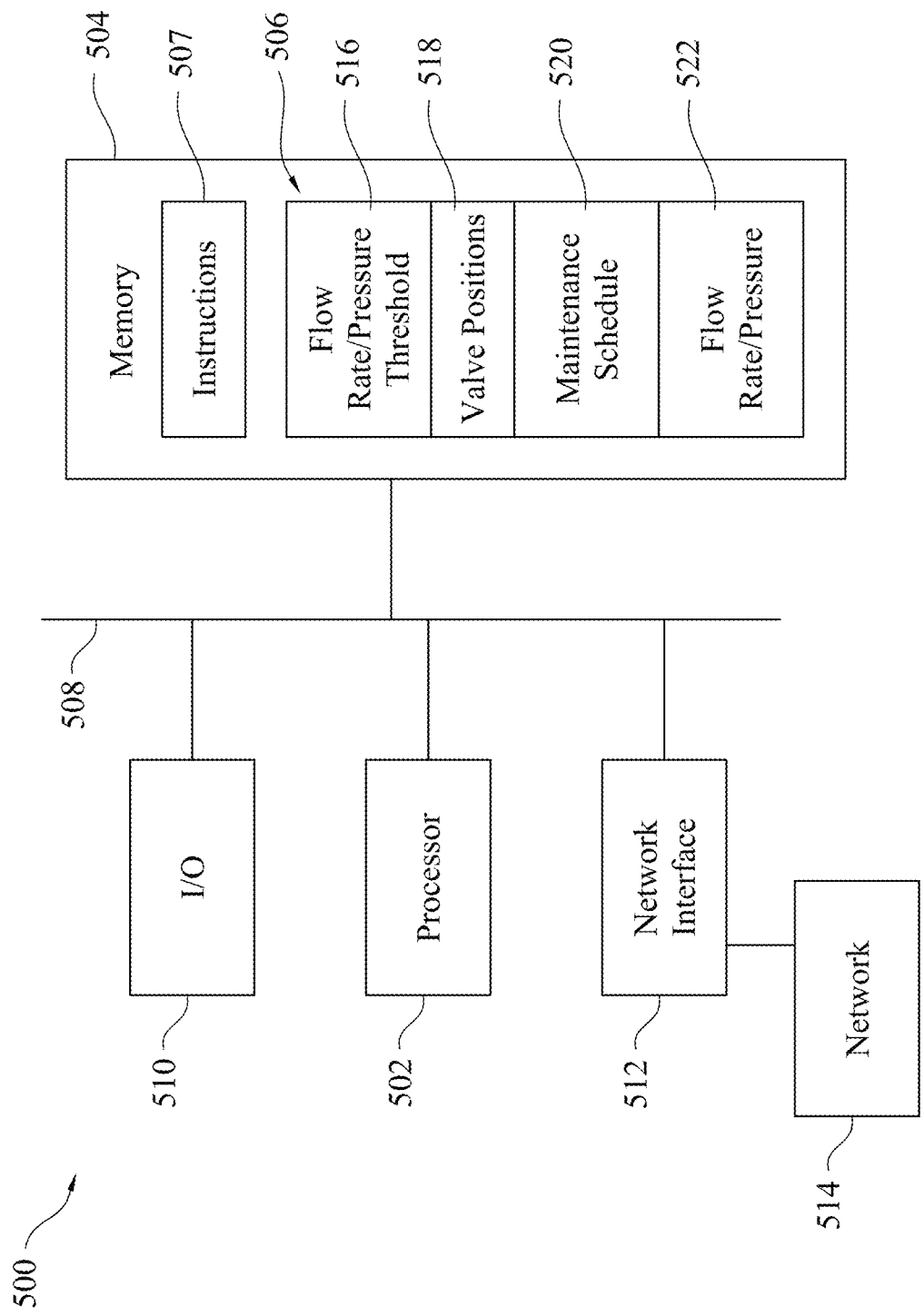
FIG. 5 is a block diagram of a controller for controlling an exhaust system, in accordance with some embodiments.

FIG. 5 is a schematic view of a system 500 for controlling an exhaust system in accordance with one or more embodiments. System 500 includes a hardware processor 502 and a non-transitory, computer readable storage medium 504 encoded with, i.e., storing, the computer program code 506, i.e., a set of executable instructions. Computer readable storage medium 504 is also encoded with instructions 507 for interfacing with manufacturing machines for producing the memory array. Processor 502 is electrically coupled to the computer readable storage medium 504 via a bus 508. The processor 502 is also electrically coupled to an I/O interface 510 by bus 508. A network interface 512 is also electrically connected to processor 502 via bus 508. Network interface 512 is connected to a network 514, so that processor 502 and computer readable storage medium 504 are capable of connecting to external elements via network 514. The processor 502 is configured to execute the computer program code 506 encoded in computer readable storage medium 504 in order to cause system 500 to be usable for performing a portion or all of the operations as described in method 400.

In some embodiments, processor 502 is a central processing unit (CPU), a multi-processor, a distributed processing system, an application specific integrated circuit (ASIC), and/or a suitable processing unit.

In some embodiments, computer readable storage medium 504 is an electronic, magnetic, optical, electromagnetic, infrared, and/or a semiconductor system (or apparatus or device). For example, computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, computer readable storage medium 504 includes a compact disk-read only memory (CD-ROM), a compact disk-read/write (CD-R/W), and/or a digital video disc (DVD).

In some embodiments, storage medium 504 stores the computer program code 506 configured to cause system 500 to perform method 400. In some embodiments, storage medium 504 also stores information needed for performing a method 400 as well as information generated during performing the 400, such as a flow rate/pressure threshold parameter 516, a valve positions parameter 518, a maintenance schedule parameter 520, a flow rate/pressure parameter 522 and/or a set of executable instructions to perform the operation of method 400.

In some embodiments, computer readable storage medium 504 stores instructions 507 for interfacing with manufacturing machines. Instructions 507 enable processor 502 to generate instructions readable by components of the exhaust system to effectively implement method 400 during a manufacturing process.

System 500 includes I/O interface 510. I/O interface 510 is coupled to external circuitry. In some embodiments, I/O interface 510 includes a keyboard, keypad, mouse, trackball, trackpad, and/or cursor direction keys for communicating information and commands to processor 502.

System 500 also includes network interface 512 coupled to processor 502. Network interface 512 allows system 500 to communicate with network 514, to which one or more other computer systems are connected. Network interface 512 includes wireless network interfaces such as BLUETOOTH, WIFI, WIMAX, GPRS, or WCDMA; or wired network interface such as ETHERNET, USB, or IEEE-1394. In some embodiments, method 400 is implemented in two or more systems 500, and information such as memory type, memory array layout, I/O voltage, I/O pin location and charge pump are exchanged between different systems 500 via network 514.

During operation, processor 502 executes a set of instructions to compare flow rate/pressure parameter 522 with flow rate/pressure threshold parameter 516. Based on the results of the comparison, process 502 is configured to execute instructions transmitting control signals to valves of an exhaust system for controlling valve positions and updating valve positions parameter 518. Processor 502 is also configured to generate messages related to the maintenance schedule based on maintenance schedule parameter 520.

An aspect of this description relates to an exhaust system. The exhaust system includes an exhaust line configured to receive an exhaust mixture. The exhaust system further includes an oscillating assembly connected to the exhaust line. The exhaust system further includes a feedback path extending from an external gas source to the oscillating assembly, wherein the feedback path is separate from the exhaust line. In some embodiments, the oscillating assembly includes a moveable element. In some embodiments, the moveable element is configured to move within the oscillating assembly in response to the oscillating assembly receiving gas from the external gas source. In some embodiments, the exhaust system further includes a controller configured to control a flow rate of gas through the feedback path. In some embodiments, the controller is configured to control the flow rate of the gas through the feedback path based on a detected flow rate through the exhaust line. In some embodiments, the exhaust system further includes a securing device configured to attach the oscillating assembly to the exhaust line. In some embodiments, the securing device surrounds the exhaust line in a cross-sectional view. In some embodiments, the exhaust system further includes a gasket between the oscillating assembly and the securing device. In some embodiments, the securing device is removably attached to the exhaust line. In some embodiments, the securing device is permanently attached to the exhaust line.

An aspect of this description relates to a method of using an exhaust system configured for production of semiconductors and componentry thereof. The method includes activating an oscillating assembly connected to an exhaust line, wherein the oscillating assembly is configured to vibrate the exhaust line. The method further includes measuring a value indicating a flow of particles through the exhaust line. The method further includes increasing a rate of vibration of the exhaust line in response to the value being below a predetermined threshold value. In some embodiments, activating the oscillating assembly includes moving a moveable element within the oscillating assembly. In some embodiments, increasing the rate of vibration includes increasing a speed of movement of the moveable element within the oscillating assembly. In some embodiments, moving the moveable includes flowing gas into the oscillating assembly from an external gas source. In some embodiments, flowing the gas into the oscillating assembly includes flowing the gas into the oscillating assembly from the external gas source separate from the exhaust line. In some embodiments, increasing the rate of vibration includes increasing a flow rate of the gas from the external gas source into the oscillating assembly.

An aspect of this description relates to an oscillating assembly. The oscillating assembly includes an oscillator configured to attach to an exhaust line for carrying an exhaust mixture comprising particles. The oscillating assembly further includes a feedback path extending from an external gas source to the oscillator, wherein the feedback path is separate from the exhaust line. The oscillating assembly further includes a controller for controlling a flow rate of gas from the external gas source to the oscillator based on a detected flow rate within the exhaust line. In some embodiments, the oscillating assembly further includes a securing device configured to attach the oscillator to the exhaust line. In some embodiments, the oscillating assembly further includes a gasket between the oscillator and the securing device. In some embodiments, the oscillator includes a moveable element configured to move based on the gas received from the external gas source.

While the disclosure has been described by way of example and in terms of the above embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An exhaust system comprising:
   an exhaust line configured to receive an exhaust mixture;
   an oscillating assembly connected to the exhaust line; and
   a feedback path extending from an external gas source to the oscillating assembly, wherein the feedback path is separate from the exhaust line.

2. The exhaust system of claim 1, wherein the oscillating assembly comprises a moveable element.

3. The exhaust system of claim 2, wherein the moveable element is configured to move within the oscillating assembly in response to the oscillating assembly receiving gas from the external gas source.

4. The exhaust system of claim 1, further comprising a controller configured to control a flow rate of gas through the feedback path.

5. The exhaust system of claim 4, wherein the controller is configured to control the flow rate of the gas through the feedback path based on a detected flow rate through the exhaust line.

6. The exhaust system of claim 1, further comprising a securing device configured to attach the oscillating assembly to the exhaust line.

7. The exhaust system of claim 6, wherein the securing device surrounds the exhaust line in a cross-sectional view.

8. The exhaust system of claim 6, further comprising a gasket between the oscillating assembly and the securing device.

9. The exhaust system of claim 6, wherein the securing device is removably attached to the exhaust line.

10. The exhaust system of claim 6, wherein the securing device is permanently attached to the exhaust line.

11. A method of using an exhaust system configured for production of semiconductors and componentry thereof, the method comprising:
    activating an oscillating assembly connected to an exhaust line, wherein the oscillating assembly is configured to vibrate the exhaust line;
    measuring a value indicating a flow of particles through the exhaust line; and
    increasing a rate of vibration of the exhaust line in response to the value being below a predetermined threshold value.

12. The method of claim 11, wherein activating the oscillating assembly comprises moving a moveable element within the oscillating assembly.

13. The method of claim 12, wherein increasing the rate of vibration comprises increasing a speed of movement of the moveable element within the oscillating assembly.

14. The method of claim 12, wherein moving the moveable element comprises flowing gas into the oscillating assembly from an external gas source.

15. The method of claim 14, wherein flowing the gas into the oscillating assembly comprises flowing the gas into the oscillating assembly from the external gas source separate from the exhaust line.

16. The method of claim 14, wherein increasing the rate of vibration comprises increasing a flow rate of the gas from the external gas source into the oscillating assembly.

17. An oscillating assembly comprising:
    an oscillator configured to attach to an exhaust line for carrying an exhaust mixture comprising particles;
    a feedback path extending from an external gas source to the oscillator, wherein the feedback path is separate from the exhaust line; and
    a controller for controlling a flow rate of gas from the external gas source to the oscillator based on a detected flow rate within the exhaust line.

18. The oscillating assembly of claim 17, further comprising a securing device configured to attach the oscillator to the exhaust line.

19. The oscillating assembly of claim 18, further comprising a gasket between the oscillator and the securing device.

20. The oscillating assembly of claim 17, wherein the oscillator comprises a moveable element configured to move based on the gas received from the external gas source.

* * * * *